United States Patent
Miyagawa (10) Patent No.: US 7,196,848 B2
(45) Date of Patent: *Mar. 27, 2007

(54) ARRAY REFRACTING ELEMENT AND EXPOSURE DEVICE

(75) Inventor: Ichirou Miyagawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 158 days.

This patent is subject to a terminal disclaimer.

(21) Appl. No.: 10/263,697

(22) Filed: Oct. 4, 2002

(65) Prior Publication Data

US 2003/0068126 A1    Apr. 10, 2003

(30) Foreign Application Priority Data

Oct. 5, 2001   (JP)   ............................. 2001-310537

(51) Int. Cl.
 G02B 27/10 (2006.01)
 G02B 27/14 (2006.01)
(52) U.S. Cl. ...................................... 359/618; 359/629
(58) Field of Classification Search ................ 359/618, 359/619, 621, 625, 626, 629
See application file for complete search history.

(56) References Cited

U.S. PATENT DOCUMENTS

| | | | |
|---|---|---|---|
| 5,015,835 A * | 5/1991 | Ohuchida et al. | 250/201.5 |
| 5,414,559 A | 5/1995 | Burghardt et al. | |
| 5,801,389 A * | 9/1998 | Mizutani et al. | 250/548 |
| 5,815,249 A * | 9/1998 | Nishi et al. | 359/619 |
| 6,108,283 A * | 8/2000 | Fujita et al. | 369/44.23 |
| 6,114,654 A * | 9/2000 | Nishiwaki | 219/121.77 |
| 6,236,477 B1 * | 5/2001 | Ishihara et al. | 359/640 |
| 6,380,966 B1 * | 4/2002 | Miyagawa | 347/241 |
| 2004/0032664 A1 * | 2/2004 | Miller et al. | 359/619 |

FOREIGN PATENT DOCUMENTS

| | | |
|---|---|---|
| JP | 09-304608 | 11/1997 |
| JP | 10-082971 | 3/1998 |
| JP | 11-133403 | 5/1999 |
| JP | 2000-221435 | 8/2000 |
| JP | 2000-224391 | 8/2000 |
| JP | 2000-284206 | 10/2000 |

OTHER PUBLICATIONS

IBM Technical Disclosure Bulletin, vol. 29, No. 11; Apr. 1987; p. 4838-4839.*

* cited by examiner

*Primary Examiner*—Alicia M Harrington
(74) *Attorney, Agent, or Firm*—Sughrue Mion, PLLC (57) ABSTRACT

An array refracting element for dividing laser beams in a sub-scanning direction, which is formed by linearly disposing a pair of refracting members, each having a unit surface shape for dividing one incident laser beam into two and emitting the divided laser beams, so that directions in which the laser beams are divided are coincident with each other and so that the refracting members locate along the division direction, is disposed on an optical path of the laser beams emitted from plural semiconductor lasers, and between a laser-beam outgoing opening of a fiber array section and a recording film. As a result, an array refracting element and an exposure device, which can improve quality of a recording image at an exposure recording apparatus at a low cost, can be obtained.

13 Claims, 11 Drawing Sheets

LASER-BEAM
INCOMING
DIRECTION D

ARRAY REFRACTING
ELEMENT

ARRAY REFRACTING
ELEMENT

ARRAY REFRACTING
ELEMENT

FIG. 12
PRIOR ART

ARRAY REFRACTING ELEMENT AND EXPOSURE DEVICE

BACKGROUND OF THE INVENTION

1. Field of the Invention

The present invention relates to an array refracting element and an exposure device, and specifically relates to an array refracting element used for changing resolution in an exposure recording apparatus, which scans a recording medium with light beams emitted from a light source so as to form an image, and to an exposure device in which resolution can be changed.

2. Description of the Related Art

Conventionally, an exposure recording apparatus has been used, wherein a drum, around which a photosensitive material (recording medium) is mounted, is rotated in a main-scanning direction, and laser beams, which have been modulated based on image data of an image to be recorded on the photosensitive material, are emitted in a sub-scanning direction orthogonal to the main-scanning direction, so as to record a two-dimensional image on the photosensitive material.

In order to record an image with a lower resolution in such an exposure recording apparatus, one of the following two methods has been used: method (1) in which a spot diameter of the laser beams on a surface of the photosensitive material is increased and a recording pitch in the sub-scanning direction is increased; and method (2) in which pixels comprising the same image data are repeatedly recorded based on the lowered resolution without increasing the spot diameter and the recording pitch. In order to record an image with a higher resolution, a method contrary to these methods has been used.

When the spot diameter of the laser beams is increased or decreased in this manner, however, a lens or the like serving as an optical system needs to be driven by using a driving mechanism, and thus, there has been a problem in that the apparatus is enlarged and cost is thereby increased. Further, when, in order to lower the resolution of the image, the pixels comprising the same image data are repeatedly recorded based on the lowered resolution, there has been another problem in that a recording speed cannot be improved because the recording pitch in the sub-scanning direction is fixed.

For the purpose of solving these problems, a technique described in Japanese Patent Application Laid-Open (JP-A) No. 2000-284206 was invented (an applicant thereof is the same as that of the present invention). A recording apparatus using this technique is provided with a plural condensing-points generation means, which divides a light beam emitted from a light source into plural light beams and generates plural condensing points on a recording medium in a sub-scanning direction thereof via a condensing optical system, and with a sub-scanning control means, which controls a recording interval in the sub-scanning direction based on a resolution. When the light beams emitted from the light source are condensed onto the recording medium via the condensing optical system so as to record an image, the number of the condensing points generated divisionally in the sub-scanning direction by the plural condensing-points generation means is controlled based on a resolution of the recording image, so as to adjust size of a beam spot and the recording interval between the beam spots in the sub-scanning direction, whereby the image can be efficiently recorded based on the resolution.

Further, in the recording apparatus using the above technique, a polarizing optical element formed by uniaxial crystal or a deviating prism is used as the plural condensing-points generation means.

However, when the polarizing optical element formed by uniaxial crystal is used as the plural condensing-points generation means in the recording apparatus using the technique described in JP-A No. 2000-284206, there has been a problem in that the uniaxial crystal is expensive and the entire cost of the apparatus is thereby increased.

Further, when the deviating prism is used as the plural condensing-points generation means in the recording apparatus using the technique described in JP-A No. 2000-284206, there has been another problem in that quality of the recording image may be degraded.

Figure 12:
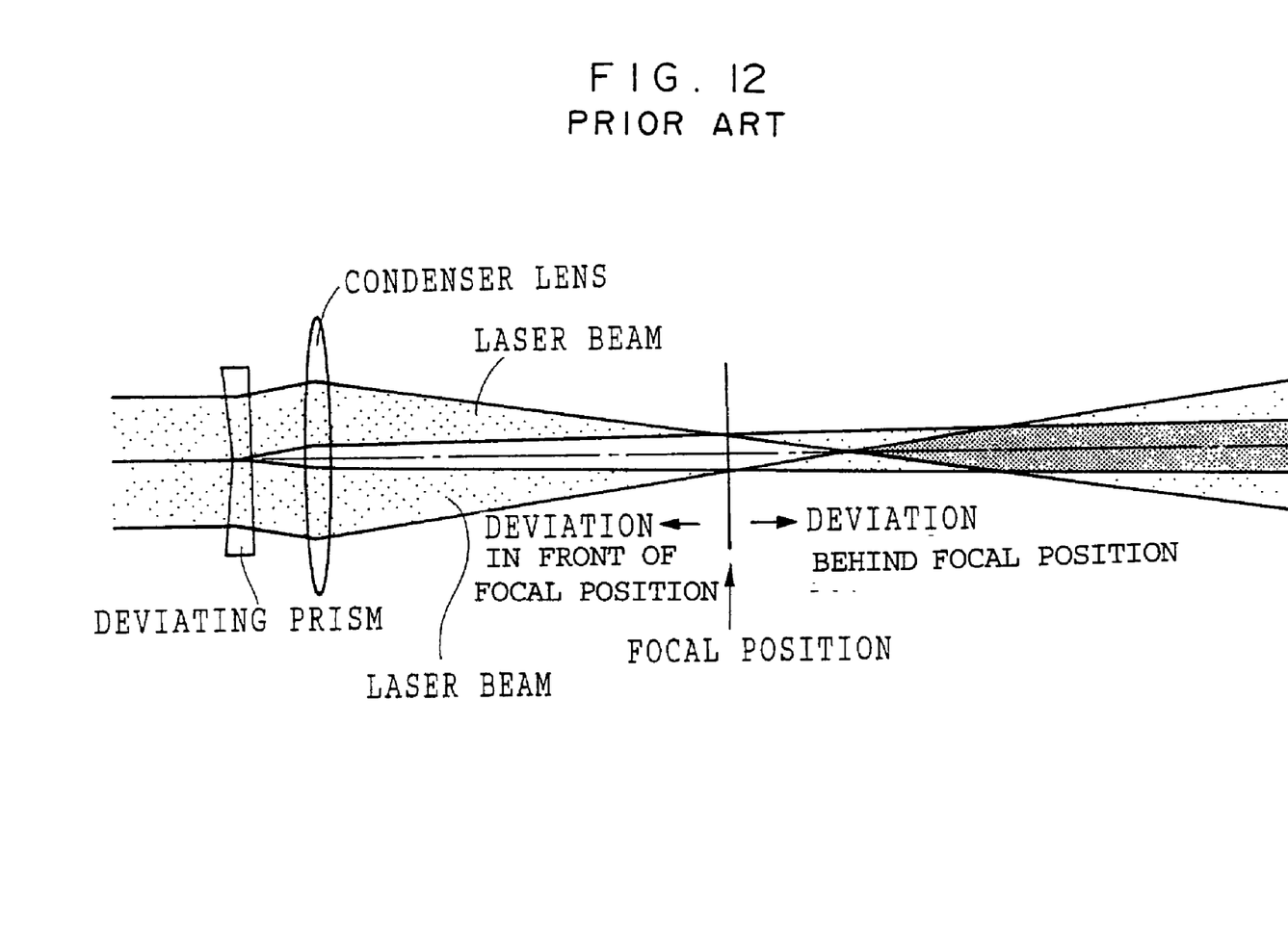
FIG. 12 is a schematic view explaining a problem in prior art.

Specifically, when the deviating prism is used as the plural condensing-points generation means in the recording apparatus using the technique described in JP-A No. 2000-284206, as exemplified in FIG. 12, blur of the laser beams at positions in front of and behind a focal position (i.e., nearer to and farther away from the deviating prism with respect to the focal position) of the laser beams in a direction of the optical axis (depth direction), wherein the laser beams have been divided by the deviating prism and condensed by a condenser lens, are asymmetrical to each other in the direction of the optical axis.

Since the light beams divided by the deviating prism are respectively condensed by the condenser lens to different positions in a division direction at the focal position, the divided light beams incoming to the focal position separate from each other, and the divided light beams outgoing from the focal position approach each other, intersect and separate from each other. This results in the above-described asymmetrical phenomenon. This phenomenon reduces a range in which the recording medium can be disposed in the depth direction. Therefore, even when the position where the recording medium is disposed is slightly deviated in the depth direction, quality of the image recorded on the recording medium may be degraded.

SUMMARY OF THE INVENTION

The present invention was invented to solve the above-described problems. It is a first object thereof to provide an array refracting element, which can improve quality of a recording image at an exposure recording apparatus at a low cost. It is a second object thereof to provide an exposure device, which can improve quality of a recording image at a low cost.

In order to attain the above first object, the array refracting element according to a first aspect of the present invention is formed by disposing in an array a pair of refracting members, each having a unit surface shape for dividing one light beam into two.

The array refracting element having the above-described structure is used in an exposure recording apparatus, the light beams respectively divided into two are respectively formed by the same number of light beams as refracting members. Thus, the same number of condensing beams as the refracting members form one condensing spot. Therefore, when each two divided light beams are put together by a condenser lens so that the condensing spots partly overlap with each other at a focal position, blur of the light beams incoming to and outgoing from the focal position are symmetrical to each other in a direction of an optical axis. As a result, quality of a recording image at the exposure recording apparatus can be improved.

The array refracting element of the present invention may be made of any material that can divide a light beam into two. Therefore, uniaxial crystal, which is required when a light beam is separated in a polarizing direction, does not necessarily need to be used, whereby the array refracting element can be formed at a low cost.

In this manner, the array refracting element according to the first aspect of the present invention is formed by disposing in an array a pair of refracting members, each having a unit surface shape for dividing one light beam into two. Accordingly, quality of a recording image obtained when the array refracting element is used in an exposure recording apparatus can be improved at a low cost.

In order to, when the array refracting element of the present invention is used in an exposure recording apparatus, put together each two light beams, which have been respectively divided into two by the respective unit surface shapes of the array refracting element, at a focal position by using a condenser lens as described above, when the array refracting element is disposed at a position where the light beams (exposure light) to be divided are substantially parallel to each other, the divided light beams need to be emitted in mutually different angular directions, and when the array refracting element is disposed at a position where the light beams are diverged or a position where they are converged, the divided light beams need to be emitted so that they are parallel to each other.

Thus, the array refracting element of the present invention preferably has a unit surface shape according to a second aspect of the present invention, which divides one incident light beam in mutually different angular directions and emits the divided light beams, or a unit surface shape according to a third aspect of the present invention, which divides one incident light beam so that the divided light beams are parallel to each other, and emits the divided light beams. Accordingly, the array refracting element of the present invention can be disposed at the position where the light beams to be divided are substantially parallel to each other, or disposed at the position where the light beams to be divided are diverged or the position where they are converged.

In order to attain the above second object, the exposure device for forming an image on a recording medium via scan-exposure, according to a fourth aspect of the present invention comprises: a light source for emitting light beams in a broad area at least in a sub-scanning direction; a condensing optical system for condensing the light beams emitted from the light source onto the recording medium; and any one of the array refracting elements according to the first to third aspects of the present invention, each disposed between the light source and the recording medium so that a direction in which the light beams are divided is substantially parallel to a broad area direction of the light beams emitted from the light source.

In accordance with the exposure device of the fourth aspect of the present invention, when the light beams emitted from the light source, which emits light beams each having a broad area at least in a sub-scanning direction, are condensed onto the recording medium by the condensing optical system, the light beams are divided in the broad area direction thereof, i.e., in the sub-scanning direction, by the array refracting element of the present invention. The light source includes various types of semiconductor lasers.

Further, in accordance with the exposure device of the fourth aspect of the present invention, blur of the light beams at positions in front of and behind the focal position of the laser beams in the direction of the optical axis (depth direction) can be symmetrical to each other in the direction of the optical axis, with the result that quality of a recording image can be improved. The array refracting element of the present invention can be produced at a lower cost as compared with that using uniaxial crystal, with the result that the apparatus can also be produced at a lower cost.

The light beams emitted from the light source are temporarily put together by the condensing optical system at a position where a far field pattern is produced.

Thus, as the exposure device according to a fifth aspect of the present invention, the array refracting element of the present invention is preferably disposed at the position where the far field pattern of the light beam emitted from the light source is produced. As a result, the array refracting element of the present invention can be uniformly operated for the light beams emitted from the light source.

The exposure device according to a sixth aspect of the present invention further comprises: an input section into which resolution information indicating a resolution of an image to be formed on the recording medium via scan-exposure is inputted; and a conveyor for moving the array refracting element, so that the array refracting element is removed from an optical axis of the laser beams emitted from the light source when the resolution indicated by the resolution information is a predetermined first resolution, and so that the array refracting element is positioned on the optical axis when the resolution indicated by the resolution information is a second resolution that is lower than the first resolution.

In accordance with the exposure device of the sixth aspect of the present invention, the resolution information indicating a resolution of an image to be formed on the recording medium via scan-exposure is inputted into the input section; and the array refracting element of the present invention is moved by the conveyor, so that the array refracting element is removed from the optical axis of the laser beams emitted from the light source when the resolution indicated by the resolution information is a predetermined first resolution, and so that the array refracting element is positioned on the optical axis when the resolution indicated by the resolution information is a second resolution that is lower than the first resolution.

Further, in accordance with the exposure device of the sixth aspect of the present invention, the resolution used when the image is recorded on the recording medium can be easily changed merely by inputting the resolution information.

As in the exposure device according to a seventh aspect of the present invention, if plural light sources of the present invention are disposed along the division direction, and the light beams emitted from the light sources are respectively divided by the array refracting element and guided to the recording medium, an image can be rapidly recorded as well as quality thereof can be improved.

DESCRIPTION OF THE PREFERRED EMBODIMENTS

Hereinafter, embodiments of the present invention will be described in detail referring to drawings. In the following embodiments, cases, in which an array refracting element and an exposure device of the present invention are applied to a laser recording apparatus, will be described.

First Embodiment

Figure 1:
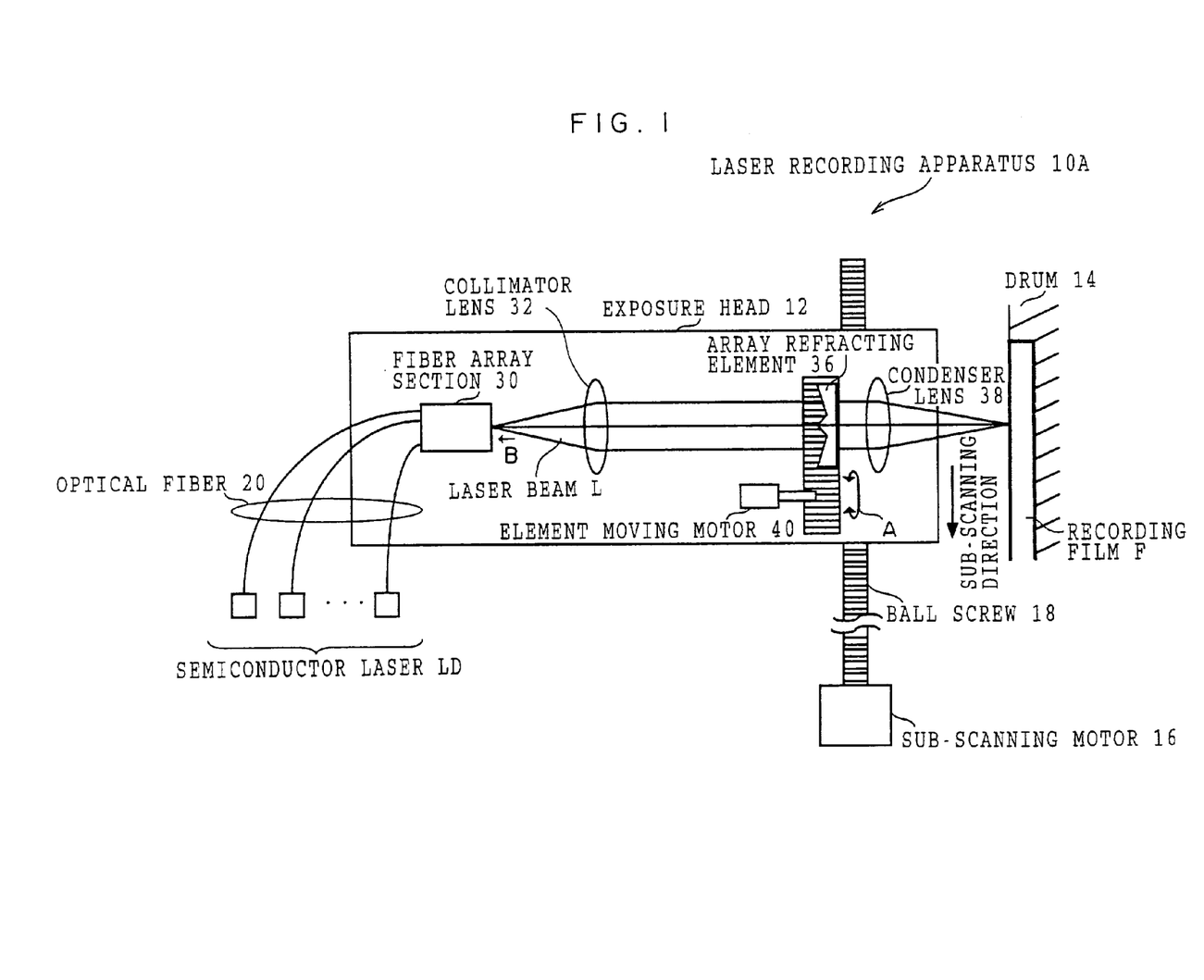
FIG. 1 is a schematic structural view (plan view) of a laser recording apparatus 10A in a first embodiment.
Figure 11A:
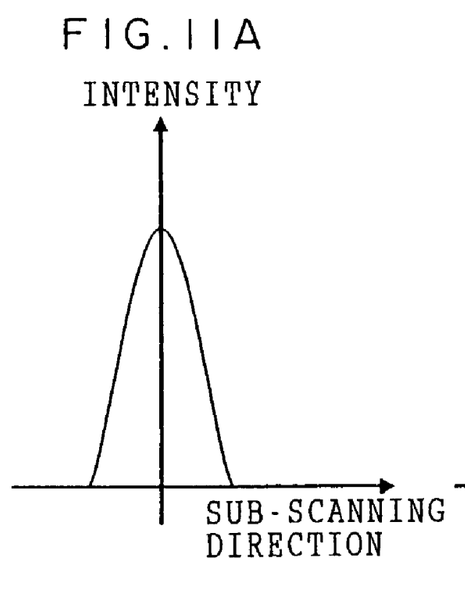
FIG. 11A is a graph showing an example of a state of intensity distribution of laser beams at a condensing point.

First, referring to FIG. 1, a structure of a laser recording apparatus 10A in the first embodiment will be described. As shown in FIG. 1, the laser recording apparatus 10A comprises at least three (seven in the first embodiment) odd semiconductor lasers LD which each emit a laser beam, an exposure head 12 which condenses the laser beams respectively emitted from the semiconductor lasers LD, a drum 14 around which a recording film F, on which an image is to be recorded, is mounted and which is rotationally driven so that the recording film F is moved in a main-scanning direction, and a sub-scanning motor 16 which rotationally drives a ball screw 18 to move the exposure head 12 disposed on the ball screw 18 in a sub-scanning direction orthogonal to the main-scanning direction. In the first embodiment, optical-fiber coupled semiconductor lasers having intensity distribution shown in FIG. 11A are used as the semiconductor lasers LD.

The exposure head 12 is provided with a transverse multimode fiber array section 30, which condenses laser beams guided from the odd semiconductor lasers LD and emits the condensed laser beams. The laser beams emitted from the semiconductor lasers LD are respectively guided to the fiber array section 30 by transverse multimode optical fibers 20. In the first embodiment, a multimode optical fiber whose core has a relatively large diameter is used as the optical fiber 20 in order to produce a high-power laser beam.

Figure 2:
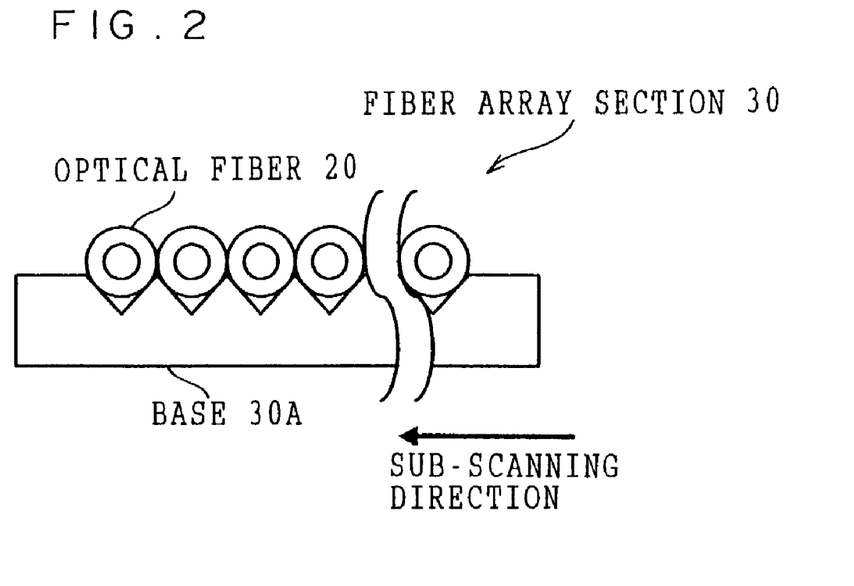
FIG. 2 is a schematic structural view (side view) of a fiber array section 30 in embodiments.

FIG. 2 shows a structure of the fiber array section 30 when it is seen in a direction of arrow B in FIG. 1. As shown in FIG. 2, the fiber array section 30 in the first embodiment includes a base 30A on which the same number of V-shaped grooves as the semiconductor lasers LD are formed adjacent to each other along the sub-scanning direction, and one optical fiber 20 is fitted in each of the V-shaped grooves. Accordingly, plural laser beams L emitted from the semiconductor lasers LD are emitted from the fiber array section 30 with a predetermined interval therebetween along the sub-scanning direction.

Semiconductor lasers LD, which each emit the laser beam L in a broad band area in one direction, may be used as light sources. In this case, each of the semiconductor lasers LD is disposed so that the broad band area direction of the laser beam L emitted therefrom is coincident with the sub-scanning direction.

In the exposure head 12, a collimator lens 32, an array refracting element 36 and a condenser lens 38 are disposed sequentially from a fiber array section 30 side.

The exposure head 12 further includes an element moving motor 40. When a rotating shaft of the element moving motor 40 is rotated in a direction of arrow A in FIG. 1, the array refracting element 36 is disposed on and removed from an optical path of the laser beams L.

Figure 3:
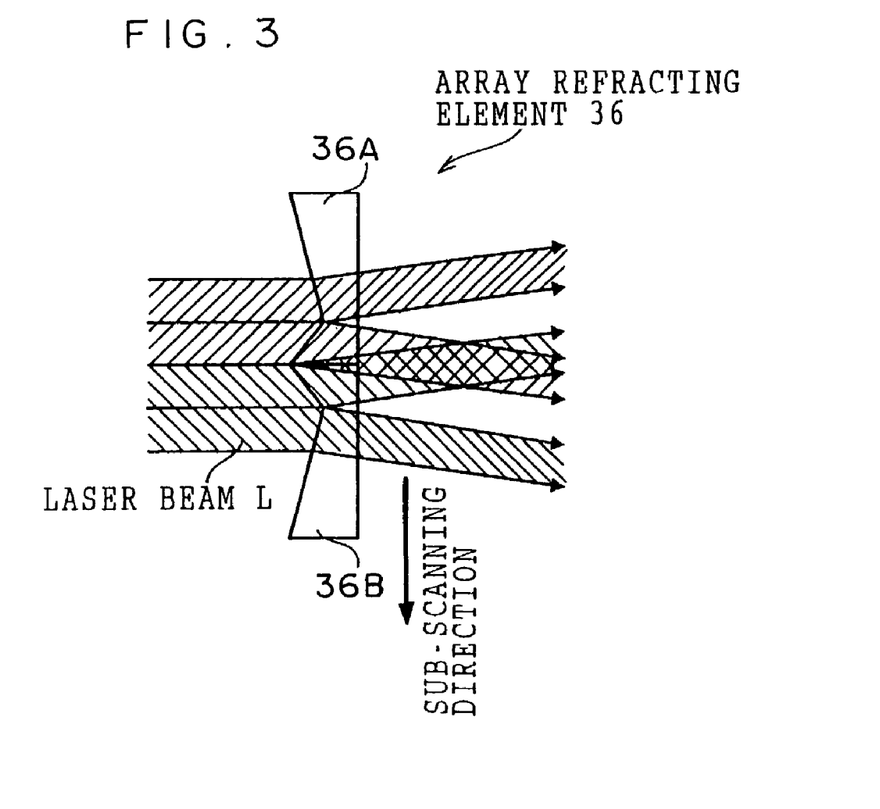
FIG. 3 is a schematic structural view (plan view) showing a structure of an array refracting element 36 in the first embodiment.

As shown in FIG. 3, the array refracting element 36 is formed by linearly disposing a pair of concave lens type deviating prisms 36A and 36B, which each have a unit surface shape for dividing an incident laser beam L into two, so that directions in which the laser beams L are divided are coincident with each other, and so that the deviating prisms 36A and 36B locate along the division direction. The array refracting element 36 is placed by the element moving motor 40, so that the direction in which the laser beams L are divided is coincident with the sub-scanning direction, and so that the array refracting element 36 can be disposed at and removed from a position where a far field pattern is produced by the collimator lens 32.

Figure 4:
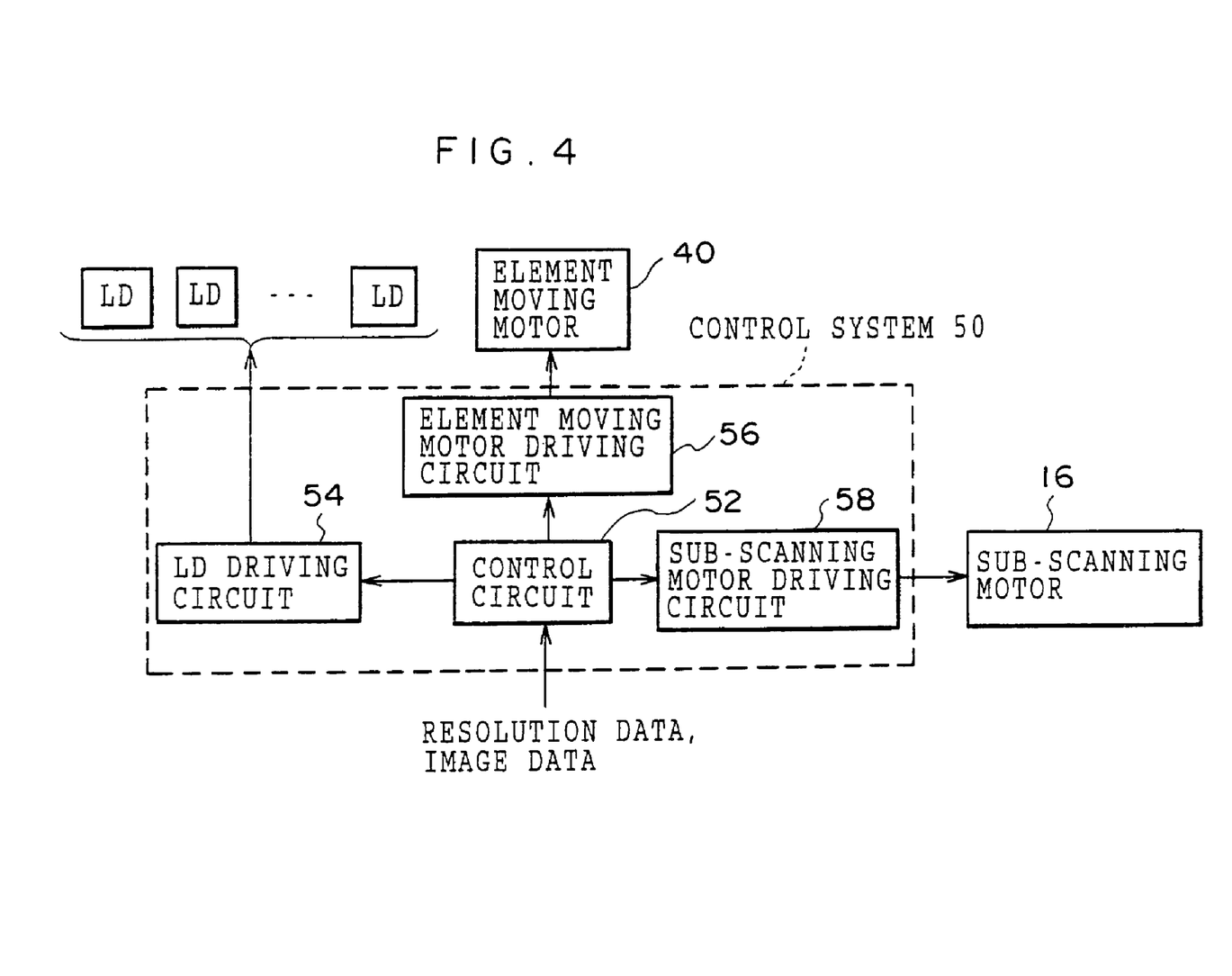
FIG. 4 is a block diagram showing a structure of a control system for laser recording apparatuses in the embodiments.

A structure of a control system 50 for the laser recording apparatus 10A in the first embodiment will now be described referring to FIG. 4. As shown in FIG. 4, the control system 50 comprises an LD driving circuit 54 for driving the semiconductor lasers LD based on image data, an element moving motor driving circuit 56 for driving the element moving motor 40, a sub-scanning motor driving circuit 58 for driving the sub-scanning motor 16, and a control circuit 52 for controlling the LD driving circuit 54, the element moving motor driving circuit 56 and the sub-scanning motor driving circuit 58. The control circuit 52 is supplied with image data representing an image to be recorded on the recording film F and with resolution data indicating a resolution for image recording.

The array refracting element 36 corresponds to an array refracting element of the present invention, the semiconductor laser LD corresponds to a light source of the present invention, the collimator lens 32 and the condenser lens 38 correspond to a condensing optical system of the present invention, the element moving motor 40 corresponds to a conveyor of the present invention, and the recording film F corresponds to a recording medium of the present invention, respectively.

Figure 5:
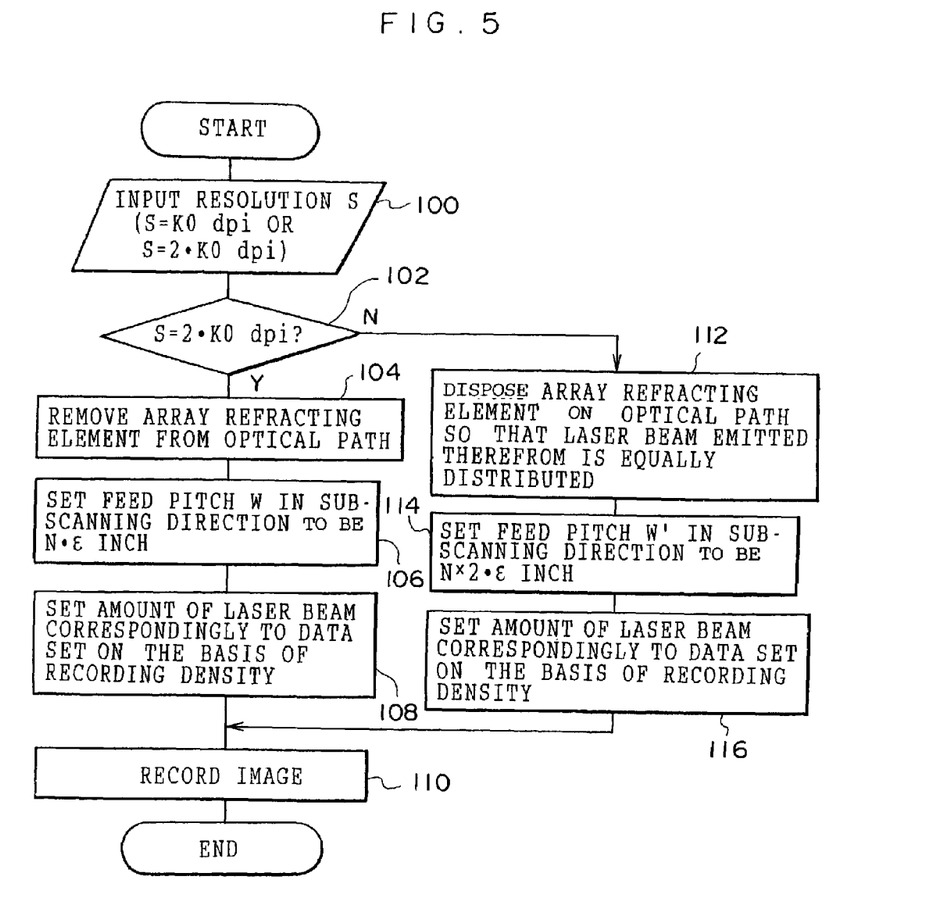
FIG. 5 is a flow chart showing a process for recording an image based on a resolution.

An operation of the laser recording apparatus 10A having the above-described structure will now be described referring to the flow chart shown in FIG. 5. In the following description, it is assumed that, if a pitch interval in the sub-scanning direction between scanning lines due to the laser beams L at a high-resolution side on the recording film F, obtained when the array refracting element 36 is not positioned on the optical path of the laser beams L (i.e., when the laser beams L are not divided), is ϵ, an interval between beam spots is set to be 2·ϵ, and an amount of deviation between beam spots on the recording film F due to two laser beams divided by the array refracting element 36 is set to be ϵ.

First, resolution data indicating resolution S of an image to be recorded is inputted to the laser recording apparatus 10A by an operator (Step 100). The resolution data and image data of the image to be recorded are supplied to the control circuit 52, and signals adjusted based on these data are supplied to the LD driving circuit 54, the element moving motor driving circuit 56 and the sub-scanning motor driving circuit 58 by the control circuit 52. The first embodiment is subsequently described on the assumption that an image can be recorded using two types of resolution, i.e., K0 (dpi) and 2·K0 (dpi), as the resolution S.

When the resolution inputted by the operator is 2·K0 (dpi) (that is, when the answer to the determination in Step 102 is affirmative), the element moving motor 40 is driven by the element moving motor driving circuit 56 to move the array refracting element 36 so that the array refracting element 36 is not positioned on the optical path of the laser beams L (Step 104). In this case, feed pitch W of the exposure head 12 in the sub-scanning direction due to the sub-scanning motor 16 is set by the sub-scanning motor driving circuit 58 as follows (Step 106):

$$W = \frac{(N-1) \times 2 \cdot \varepsilon}{2} + \varepsilon = N \cdot \varepsilon$$

wherein, N is the number of the semiconductor lasers LD ('seven' in the first embodiment).

Namely, when the resolution is 2·K0 (dpi), the array refracting element 36 is removed from the optical path of the laser beams L so as not to divide the laser beams L in the sub-scanning direction. Accordingly, the resolution is doubled as compared with that in the case where the laser beams L are divided.

After the array refracting element 36 has been moved and the feed pitch W in the sub-scanning direction has been set as described above, drive of each semiconductor laser LD is controlled by the LD driving circuit 54 based on the image data, so that the respective semiconductor laser LD emits the laser beam L in an amount corresponding to data which has been set on the basis of recording density (Step 108).

The laser beams L emitted from the semiconductor lasers LD are made parallel to each other by the collimator lens 32, and then condensed onto the recording film F on the drum 14 via the condenser lens 38.

Figure 6A:
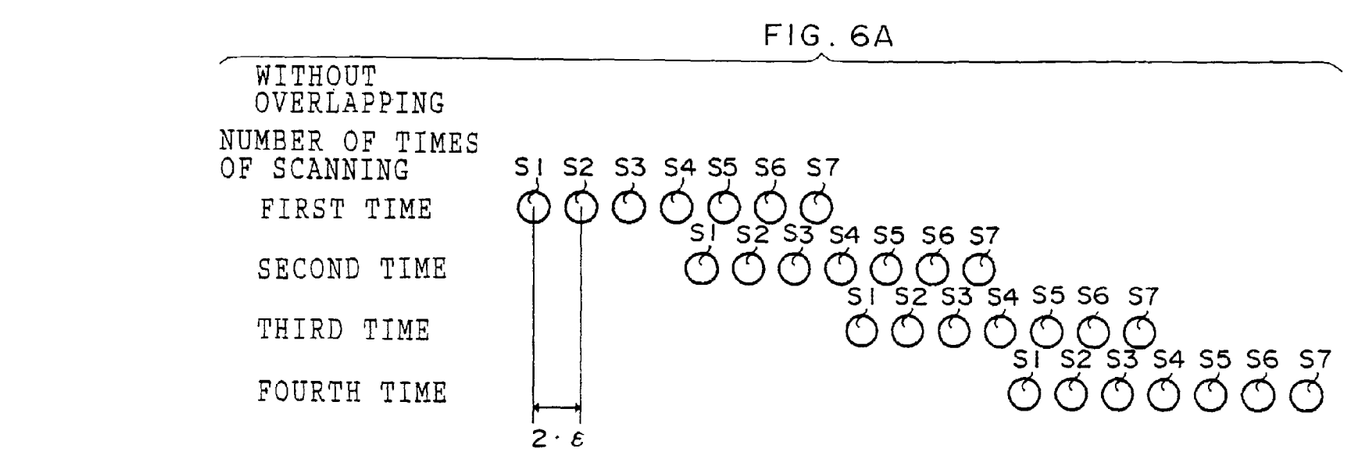
FIG. 6A is a schematic view showing a state of beam spots on a recording film F in the laser recording apparatuses in the embodiments.

In this case, beam spots S1 to S7 (FIG. 6A) each having intensity distribution shown in FIG. 11A are formed on the recording film F. When the exposure head 12 is fed with the feed pitch W in the sub-scanning direction and the drum 14 is rotated in the main-scanning direction, as shown in FIG. 6A, the beam spots S1 to S7 form a two-dimensional image having a resolution of 2·K0 (dpi) on the recording film F (Step 110).

Another case in which the resolution is changed from 2·K0 (dpi) to K0 (dpi) (that is, in which the answer to the determination in Step 102 is negative) will now be described. In this case, the element moving motor 40 is driven by the element moving motor driving circuit 56 to move the array refracting element 36 so that the array refracting element 36 is positioned on the optical path of the laser beams L (Step 112). Further, feed pitch W' of the exposure head 12 in the sub-scanning direction due to the sub-scanning motor 16 is set by the sub-scanning motor driving circuit 58 as follows (Step 114):

$$W' = N \times 2 \cdot \varepsilon.$$

Namely, when the resolution is K0 (dpi), the array refracting element 36 is positioned on the optical path of the laser beams L so as to divide the respective laser beam L emitted into the array refracting element 36 into plural ('two' in the first embodiment) laser beams L in the sub-scanning direction. Accordingly, the resolution is halved as compared with that in the case where the laser beams L are not divided.

After the array refracting element 36 has been moved and the feed pitch W' in the sub-scanning direction has been set as described above, drive of each semiconductor laser LD is controlled by the LD driving circuit 54 based on the image data, so that the respective semiconductor laser LD emits the laser beam L in an amount corresponding to data which has been set on the basis of recording density (Step 116).

The laser beams L emitted from the semiconductor lasers LD are made parallel to each other by the collimator lens 32, supplied to the array refracting element 36, and respectively divided into four in the sub-scanning direction (beam sharing). Then, the laser beams respectively divided into four are condensed onto the recording film F on the drum 14 via the condenser lens 38 in a state of being respectively divided into two.

Figure 7A:
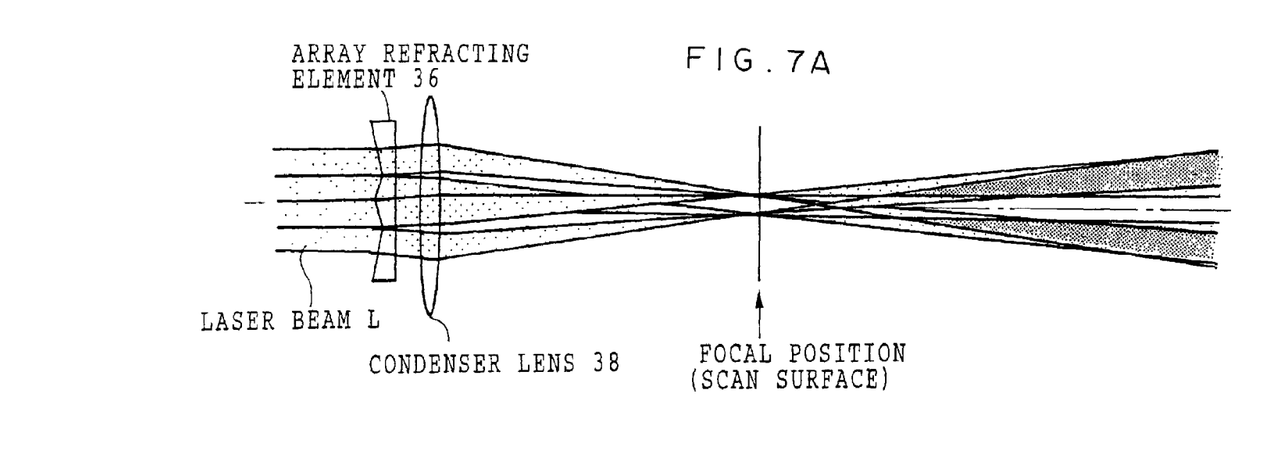
FIG. 7A is a schematic view (plan view) explaining an operation of the laser recording apparatus 10A in the first embodiment.
Figure 7B:
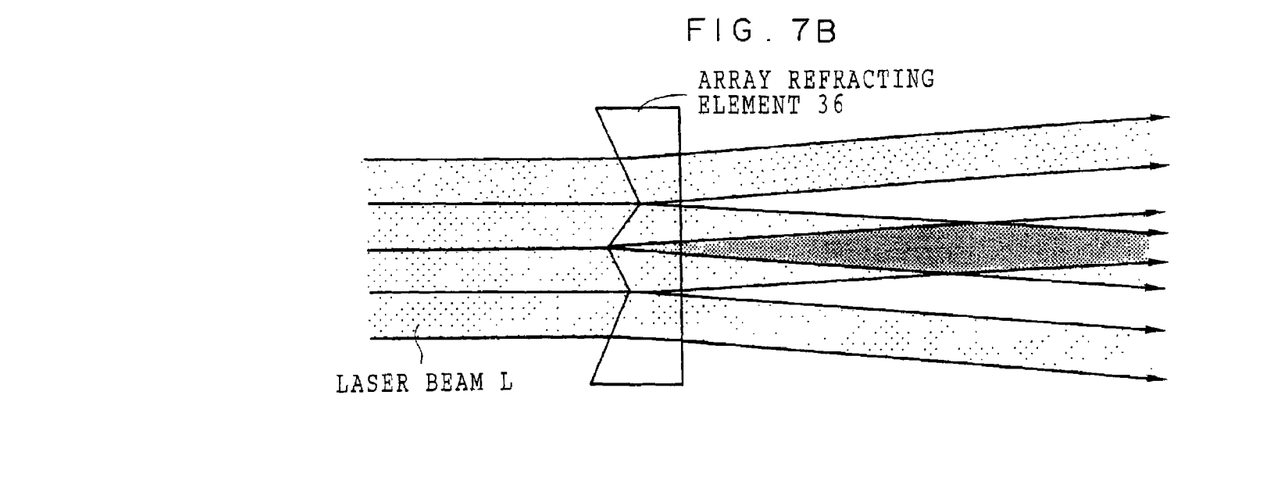
FIG. 7B is a schematic view (plan view) explaining a structure and an operation of the array refracting element 36 in the first embodiment.

In other words, when the array refracting element 36 is disposed, as shown in FIG. 7A, at a position where the laser beams L on the optical axis are parallel to each other and near a position where a far field pattern is produced, the laser beams L are respectively divided into four temporarily by the array refracting element 36 as shown in FIG. 7B, and the laser beams L respectively divided into four by the array refracting element 36 are condensed by the condenser lens 38 as shown in FIG. 7A, such that each two laser beams are put together in the sub-scanning direction on a scan surface, with the result that the laser beams L are respectively divided into two.

At this time, the same number of condensing beams as the deviating prisms form one condensing spot. Therefore, blur of the laser beams L incoming to and outgoing from a focal position are symmetrical to each other in a direction of the optical axis. As a result, quality of a recording image at the laser recording apparatus 10A can be improved.

Figure 11B:
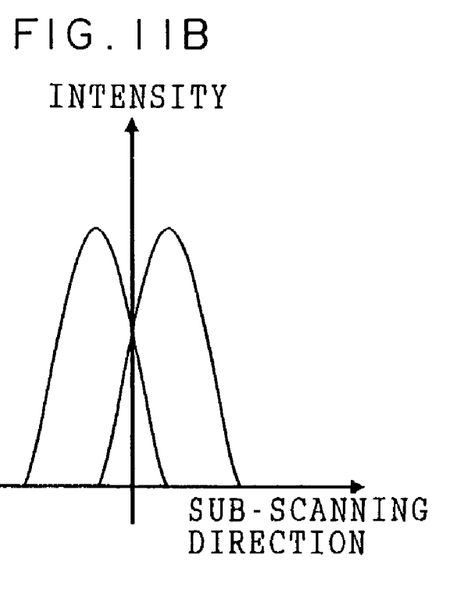
FIG. 11B is a graph showing another example of the state of the intensity distribution of the laser beams at the condensing point.

In this case, beam spots S1' to S7' (FIG. 6B) each having two types of intensity distribution shown in FIG. 11B, i.e., intensity distribution produced by synthesizing the respective ones of the two divided laser beams L in the sub-scanning direction, are formed on the recording film F.

Figure 6B:
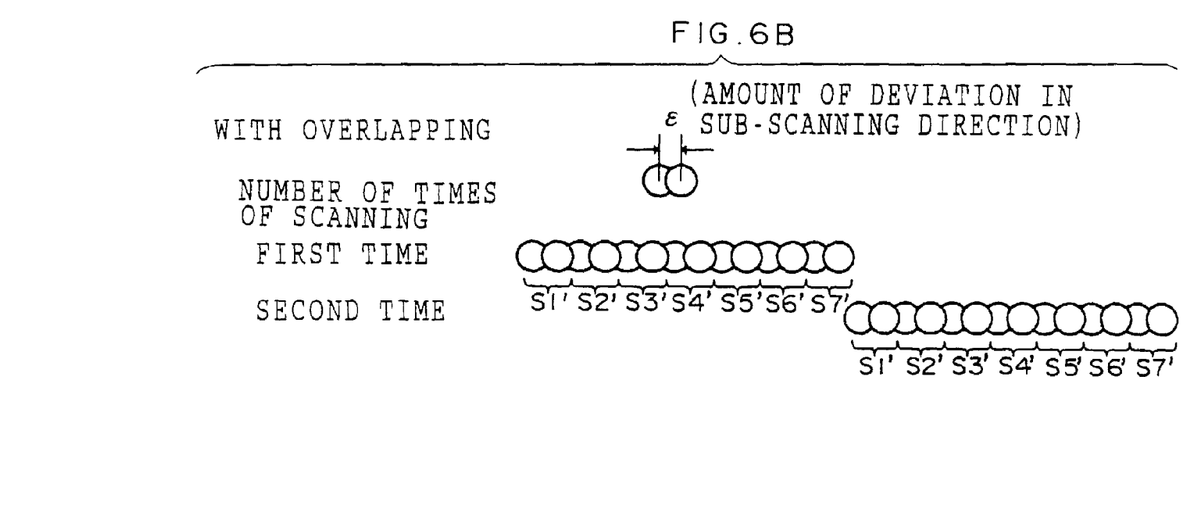
FIG. 6B is a schematic view showing another state of the beam spots on the recording film F in the laser recording apparatuses in the embodiments.

When the exposure head 12 is fed with the feed pitch W' in the sub-scanning direction and the drum 14 is rotated in the main-scanning direction, as shown in FIG. 6B, the beam spots S1' to S7' form a two-dimensional image having a resolution of K0 (dpi) on the recording film F (Step 110).

When the resolution of the recording image is changed from 2·K0 (dpi) to K0 (dpi) in this manner, the beam spots S1 to S7 can be easily enlarged to the beam spots S1' to S7' merely by disposing the array refracting element 36 on the optical path of the laser beams L, and the image can be rapidly recorded because a speed of the sub-scanning is increased.

In the same manner, the resolution can be changed from K0 (dpi) to 2·K0 (dpi).

The above-described process in Step 100 corresponds to a process at the input section of the present invention.

As described above in detail, the array refracting element 36 in the first embodiment is formed by disposing in an array the deviating prisms 36A and 36B, which each divide one incident laser beam into two and emit the divided laser beams. Accordingly, when the array refracting element 36 is used in the laser recording apparatus 10A, quality of the recording image can be improved at a low cost.

Further, the array refracting element 36 in the first embodiment has unit surface shapes each dividing one incident laser beam in mutually different angular directions and emitting the divided laser beams. Accordingly, the array refracting element 36 can be disposed at a position where the laser beams to be divided are substantially parallel to each other.

Since the array refracting element 36 in the first embodiment is formed by the deviating prisms 36A and 36B, cost can be considerably reduced as compared with the array refracting element 36 formed by uniaxial crystal.

In the first embodiment, a case, in which an element formed by disposing the concave lens type deviating prisms 36A and 36B is used as the array refracting element 36, has been described. The present invention, however, is not limited to this, and any refracting element, that is formed by disposing in an array a pair of refracting members each having a unit surface shape for dividing one laser beam into two, can be used as the array refracting element 36.

Figure 8A:
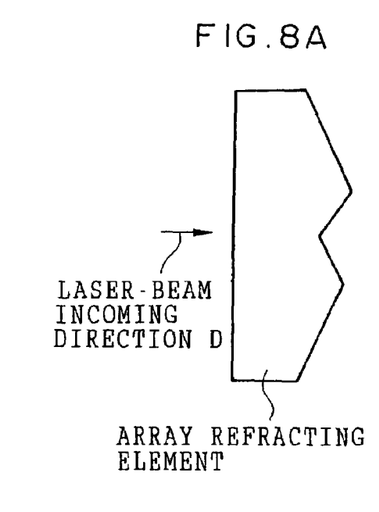
FIG. 8A is a schematic structural view (plan view) showing another example of the structure of the array refracting element of the present invention.
Figures 8B, 8C:
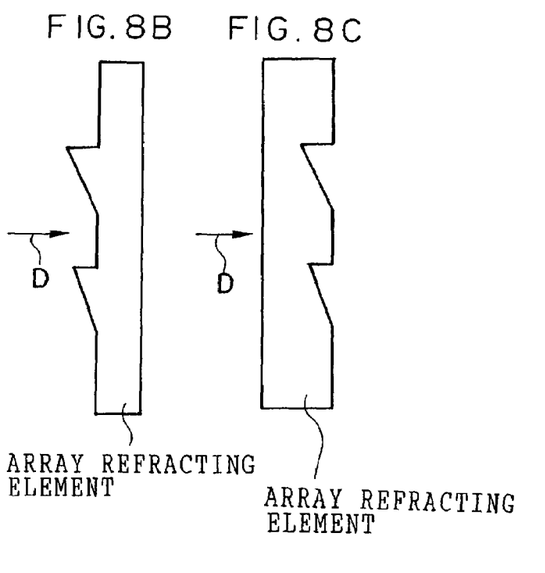
FIG. 8B is a schematic structural view (plan view) showing another example of the structure of the array refracting element of the present invention.
FIG. 8C is a schematic structural view (plan view) showing another example of the structure of the array refracting element of the present invention.

FIGS. 8A to 8C are plan views showing other examples of the shape of the array refracting element 36 in the first embodiment. The array refracting element shown in FIG. 8A is formed by disposing linearly along the sub-scanning direction a pair of unit surface shapes, each being convex at a side from which a laser beam is emitted. The array refracting element shown in FIG. 8B is formed by disposing linearly along the sub-scanning direction a pair of unit surface shapes, each having a combination of surfaces, that is, a surface formed so as to be parallel to the direction of the optical axis at a side into which a laser beam is emitted, and a surface formed so as to be inclined from one edge at a laser-beam incoming side of the parallel surface with respect to the direction of the optical axis. The array refracting element shown in FIG. 8C is formed by disposing linearly along the sub-scanning direction a pair of unit surface shapes, each having a combination of surfaces, that is, a surface formed so as to be parallel to the direction of the optical axis at the side from which a laser beam is emitted, and a surface formed so as to be inclined from one edge at the laser-beam incoming side of the parallel surface with respect to the direction of the optical axis. In the array refracting element shown in FIG. 8B, each of the unit surface shapes is convex at the side into which a laser beam is emitted. In the array refracting element shown in FIG. 8C, each of the unit surface shapes is concave at the side from which a laser beam is emitted.

Of course, an array refracting element, which is integrally formed so as to have the same shape as the array refracting element 36 in the first embodiment, can also be used.

Also when these array refracting elements are used, the same effects as in the first embodiment can be obtained.

Second Embodiment

In the above first embodiment, a case has been described, in which the array refracting element of the present invention is disposed at a position where light beams are substantially parallel to each other, in order to divide an incident light beam in mutually different angular directions and emit the divided light beams. In a second embodiment, however, another case will be described, in which an array refracting element is disposed at a position where light beams are converged, in order to divide an incident light beam so that the divided light beams are parallel to each other, and emit the divided light beams.

First, referring to FIG. 9, a structure of a laser recording apparatus 10B in the second embodiment will be described. Components of the laser recording apparatus 10B shown in FIG. 9, which are identical to those of the laser recording apparatus 10A shown in FIG. 1, will be referred to using the same reference numerals as in FIG. 1, and description thereof will be omitted.

Figure 9:
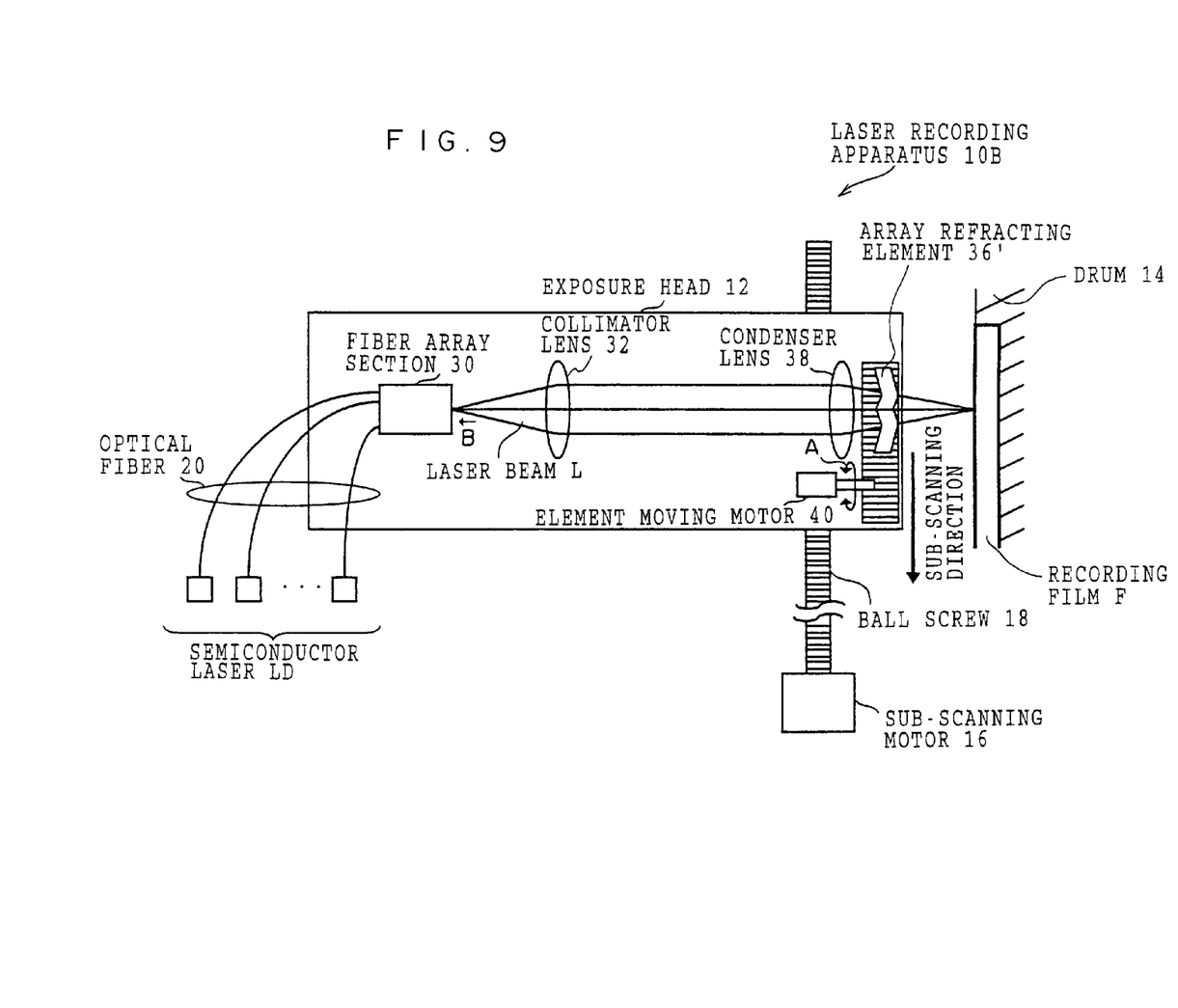
FIG. 9 is a schematic structural view (plan view) of a laser recording apparatus 10B in a second embodiment.

As shown in FIG. 9, the laser recording apparatus 10B in the second embodiment is different from the laser recording apparatus 10A in the above-described first embodiment, only in that an array refracting element 36' is used in place of the array refracting element 36, and in that the array refracting element 36' is disposed at a position between the condenser lens 38 and the recording film F, where the laser beams L are converged.

Figure 10A:
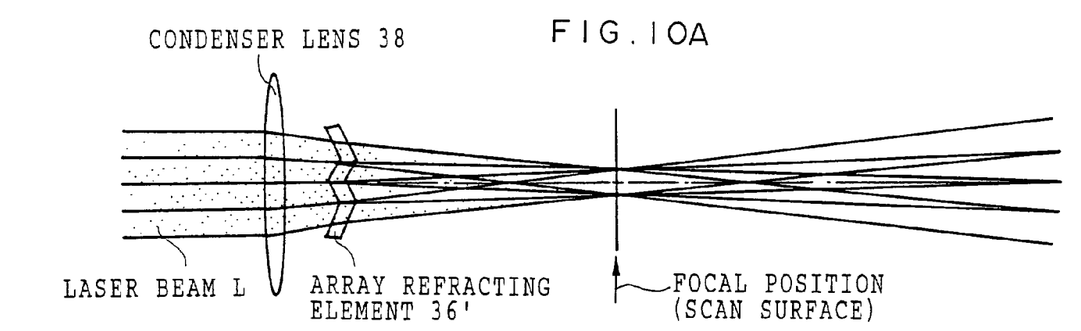
FIG. 10A is a schematic view (plan view) explaining an operation of the laser recording apparatus 10B in the second embodiment.
Figure 10B:
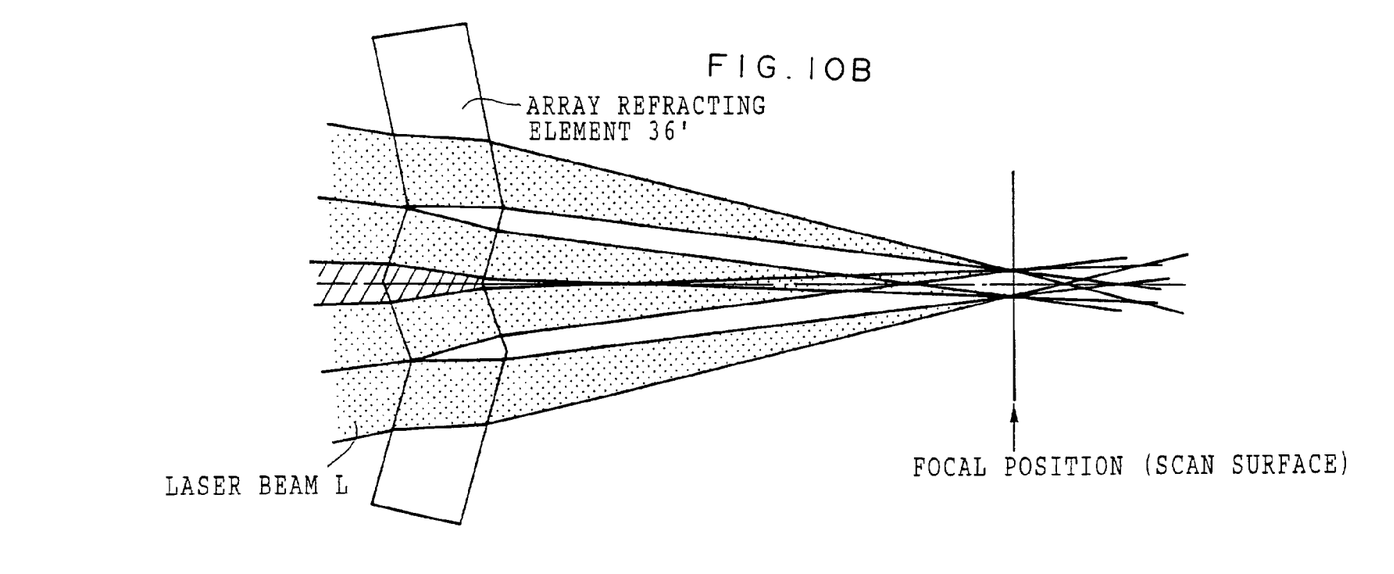
FIG. 10B is a schematic view (plan view) explaining a structure and an operation of an array refracting element 36' in the second embodiment.

As shown in FIG. 10B, the array refracting element 36' in the second embodiment is formed by linearly disposing a pair of unit surface shapes, which each divide an incident laser beam L into two and emit the divided two laser beams so that they are parallel to each other, so that directions in which the laser beams L are divided are coincident with each other, and so that the unit surface shapes locate along the division direction. The array refracting element 36' is placed by the element moving motor 40 so that the direction in which the laser beams L are divided is coincident with the sub-scanning direction.

When the resolution is set to be K0 (dpi), the laser beams L emitted from the semiconductor lasers LD are made parallel to each other by the collimator lens 32, and then, as shown in FIG. 10A, supplied to and condensed by the condenser lens 38.

The laser beams L, which have been condensed by the condenser lens 38, are supplied to the array refracting element 36', and respectively divided into four in the sub-scanning direction (beam sharing) as shown in FIG. 10B. Each two divided laser beams are respectively emitted from a pair of parts corresponding to the unit surface shapes of the array refracting element 36', so that the respective two laser beams are parallel to each other. Then, the divided four laser beams L are condensed onto the recording film F provided on the drum 14, such that each two laser beams are put together in the sub-scanning direction on a scan surface, with the result that the laser beams L are respectively divided into two.

At this time, the same number of condensing beams as the refracting members form one condensing spot. Therefore, blur of the laser beams L incoming to and outgoing from a focal position are symmetrical to each other in a direction of the optical axis. As a result, quality of a recording image at the laser recording apparatus 10B can be improved.

In this case, beam spots S1' to S7' (FIG. 6B) each having two types of intensity distribution shown in FIG. 11B, i.e., intensity distribution produced by synthesizing the respective ones of the two divided laser beams L in the sub-scanning direction, are formed on the recording film F.

When the exposure head 12 is fed with the feed pitch W' in the sub-scanning direction and the drum 14 is rotated in the main-scanning direction, as shown in FIG. 6B, the beam spots S1' to S7' form a two-dimensional image having a resolution of K0 (dpi) on the recording film F.

When an image having a resolution of 2·K0 (dpi) is formed, the array refracting element 36' should be moved so as not to be positioned on the optical path of the laser beams L, and should be controlled so as to obtain the beam spots S1 to S7 shown in FIG. 6A.

As described above in detail, the array refracting element 36' in the second embodiment is formed by disposing side by side a pair of refracting members, which each have a unit surface shape for dividing one incident laser beam into two and emitting the divided laser beams. Accordingly, when the array refracting element 36' is used in the laser recording apparatus 10B, quality of the recording image can be improved at a low cost.

Further, the array refracting element 36' in the second embodiment has the above-described unit surface shapes, which each divide one incident laser beam into two and emit the divided laser beams so that they are parallel to each other. Accordingly, the array refracting element 36' can be disposed at a position where the laser beams to be divided are diverged, or a position where they are converged.

In each of the laser recording apparatuses 10A and 10B in the above-described embodiments, the array refracting element is disposed between the fiber array section 30 and the recording film F, so that the direction in which the laser beams are divided is parallel to a broad area direction thereof. Therefore, blur of the laser beams at positions in front of and behind the focal position of the laser beams in the direction of the optical axis (depth direction) can be symmetrical to each other in the direction of the optical axis, with the result that quality of a recording image can be improved. Further, the array refracting element in each of these embodiments can be produced at a lower cost as compared with that using uniaxial crystal, with the result that the apparatus can also be produced at a lower cost.

In each of the laser recording apparatuses 10A and 10B in the above-described embodiments, the array refracting element is disposed at a position where a far field pattern of the laser beam is produced. Thus, the array refracting element can be uniformly operated for all of the laser beams L emitted from the semiconductor lasers LD.

In each of the laser recording apparatuses 10A and 10B in the above-described embodiments, resolution information (corresponding to "resolution data" in each of the above embodiments) indicating a resolution of an image to be formed on the recording film F via scan-exposure is inputted, and, when the resolution indicated by the resolution information is a predetermined first resolution (2·K0 (dpi) in each of the above embodiments), the array refracting element is removed from the optical axis of the laser beams emitted from the semiconductor lasers LD, or, when the resolution indicated by the resolution information is a second resolution (K0 (dpi) in each of the above embodiments) that is lower than the first resolution, the array refracting element is moved so as to be positioned on the optical axis. Therefore, the resolution used when the image is recorded on the recording film F can be easily changed merely by inputting the resolution information.

In each of the laser recording apparatuses 10A and 10B in the above-described embodiments, plural semiconductor lasers LD are disposed along the direction in which the laser beams L are divided by the array refracting element, and the laser beams L emitted from the semiconductor lasers LD are respectively divided by the array refracting element and guided to the recording film F, whereby an image can be rapidly recorded.

Although a case, in which the array refracting element 36' is disposed at a position where the laser beams are condensed, has been described in the above second embodiment, the present invention is not limited to this. For example, the array refracting element 36' may be disposed at a position where the laser beams are diverged, i.e., a position between the fiber array section 30 and the collimator lens 32. Also in this case, the same effects as in the second embodiment can be obtained.

Further, although a case, in which the present invention is applied to the laser recording apparatus for multi-beam scanning, has been described in each of the above embodiments, the present invention is not limited to this. For example, the present invention may be applied to a laser recording apparatus for single-beam scanning, in which a light source comprises one semiconductor laser. Also in this case, the same effects as in each of the above embodiments can be obtained.

What is claimed is:

1. An exposure device for forming an image on a recording medium via scan-exposure, said device comprising:
  a light source for emitting light beams in a broad area at least in a sub-scanning direction for forming the image;
  a condensing optical system for condensing the light beams emitted from the light source onto the recording medium; and
  an array refracting element disposed between the light source and the recording medium so that a direction in which the light beams are divided is substantially parallel to a broad area direction of the light beams emitted from the light source, the array refracting element comprising at least two refracting members abutting each other and disposed in an array, wherein a light beam is incident on the array, and each of the at least two refracting members has a surface shape that divides a portion of the light beam incident on the refracting member into two separate light beams, thereby resulting in at least four light beams.

2. The exposure device of claim 1, wherein the surface shape of each of the at least two refracting members divides the incident light beam into two separate light beams having mutually different angular directions and emits the divided light beams.

3. The exposure device of claim 2, wherein the array refracting element is disposed at a position where a far field pattern of the light beam emitted from the light source is formed.

4. The exposure device of claim 1, wherein the surface shape of each of the at least two refracting members divides the incident light beam so that the divided light beams are parallel to each other, and emits the divided light beams.

5. The exposure device of claim 4, wherein the array refracting element is disposed at a position where a far field pattern of the light beam emitted from the light source is formed.

6. The exposure device of claim 1, wherein the array refracting element is disposed at a position where a far field pattern of the light beam emitted from the light source is formed.

7. The exposure device of claim 6, further comprising:
an input section into which resolution information indicating a resolution of an image to be formed on the recording medium via scan-exposure is inputted; and
a conveyor for moving the array refracting element so that
the array refracting element is removed from an optical axis of the laser beams emitted from the light source when the resolution indicated by the resolution information is a predetermined first resolution, and
the array refracting element is positioned on the optical axis when the resolution indicated by the resolution information is a second resolution that is lower than the first resolution.

8. The exposure device of claim 7, wherein plural light sources are disposed along the division direction.

9. The exposure device of claim 6, wherein plural light sources are disposed along the division direction.

10. The exposure device of claim 1, further comprising:
an input section into which resolution information indicating a resolution of an image to be formed on the recording medium via scan-exposure is inputted; and
a conveyor for moving the array refracting element so that
the array refracting element is removed from an optical axis of the laser beams emitted from the light source when the resolution indicated by the resolution information is a predetermined first resolution, and
the array refracting element is positioned on the optical axis when the resolution indicated by the resolution information is a second resolution that is lower than the first resolution.

11. The exposure device of claim 10, wherein plural light sources are disposed along the division direction.

12. The exposure device of claim 1, wherein plural light sources are disposed along the division direction.

13. The exposure device of claim 1, wherein each of the two or more refracting members comprises a first surface facing the light source and a second surface, opposite the first surface, where the first surface comprises a first planar region and a second planar region inclined with respect to the first planar region.

* * * * *